United States Patent
Resciniti et al.

(10) Patent No.: US 11,745,363 B1
(45) Date of Patent: Sep. 5, 2023

(54) COMPACT SELF-CENTERING COMPLIANT JOINT

(71) Applicant: The United States of America, as represented by the Secretary of the Navy, Arlington, VA (US)

(72) Inventors: Michael L. Resciniti, Belle Mead, NJ (US); Perry S Levitt, Philadelphia, PA (US); Jeremy M. Lamb, Garnet Valley, PA (US)

(73) Assignee: The United States of America, as represented by the Secretary of the Navy, Arlington, VA (US)

(*) Notice: Subject to any disclaimer, the term of this patent is extended or adjusted under 35 U.S.C. 154(b) by 21 days.

(21) Appl. No.: 17/249,300

(22) Filed: Feb. 26, 2021

(51) Int. Cl.
B25J 17/02 (2006.01)

(52) U.S. Cl.
CPC ....... B25J 17/0208 (2013.01); B25J 17/0241 (2013.01)

(58) Field of Classification Search
CPC .............. B25J 17/0208; B25J 17/0258; B25J 17/0275; B25J 17/0225; B25J 17/0233; B25J 17/0216; B25J 17/0241; F16B 7/0406; F16D 3/26
USPC ....................................................... 464/160
See application file for complete search history.

(56) References Cited

U.S. PATENT DOCUMENTS

| | | | | |
|---|---|---|---|---|
| 4,098,001 A * | 7/1978 | Watson | ................ | B25J 17/0208 901/45 |
| 4,179,783 A * | 12/1979 | Inoyama | ................ | B23P 19/12 901/45 |
| 4,557,623 A * | 12/1985 | Tella | .................... | B25J 17/0275 92/24 |
| 4,789,292 A * | 12/1988 | Holcomb | ............. | B25J 17/0208 29/709 |
| 5,271,686 A * | 12/1993 | Herring, Jr. | .............. | B21J 15/10 901/29 |
| 7,473,048 B2 * | 1/2009 | Nakamura | ............ | F16B 7/0406 403/56 |
| 10,286,556 B2 * | 5/2019 | Troy | ...................... | B25J 9/1692 |
| 10,315,316 B2 * | 6/2019 | Uchikawa | ............ | B25J 17/0266 |
| 10,537,993 B2 * | 1/2020 | Ulliman | ................ | B24B 55/102 |
| 11,312,024 B2 * | 4/2022 | Takagi | ................. | B25J 17/0208 |
| 11,524,415 B2 * | 12/2022 | Nighswander | ......... | F16M 11/14 |
| 2016/0151920 A1* | 6/2016 | Nakata | ................. | B25J 17/0275 901/29 |
| 2017/0074316 A1* | 3/2017 | Kim | ...................... | A61F 5/0125 |
| 2019/0363498 A1* | 11/2019 | Cox | ..................... | B25J 19/0029 |

FOREIGN PATENT DOCUMENTS

| | | | | |
|---|---|---|---|---|
| CN | 105599004 A | * | 5/2016 | ......... B25J 17/0208 |
| CN | 109531619 A | * | 3/2019 | ......... B25J 17/0208 |
| DE | 3611806 A1 | * | 10/1987 | ......... B25J 17/0208 |
| EP | 0311171 A1 | * | 4/1989 | |
| FR | 2561973 A1 | * | 10/1985 | |
| JP | S61209846 A | * | 9/1986 | |

* cited by examiner

Primary Examiner — Gregory Robert Weber
(74) Attorney, Agent, or Firm — Mark J. Rosen

(57) ABSTRACT

A self-centering compliant joint for connecting an actuator and an effector, provides five degrees of freedom, minimizes the effects of side loads, transfers compressive loads into tensile loads on internal components, and self-centers.

16 Claims, 2 Drawing Sheets

US 11,745,363 B1

COMPACT SELF-CENTERING COMPLIANT JOINT

STATEMENT OF GOVERNMENT INTEREST

The invention described herein may be manufactured and used by or for the Government of the United States of America for governmental purposes without payment of any royalties thereon or therefor.

FIELD OF THE INVENTION

The invention is related to the field of linear actuators and joints therefor, without certain disadvantages of conventional joints.

BACKGROUND OF THE INVENTION

Actuators are used in a variety of applications for transferring motion or force from an input energy source into a desired motion. Such motion is generally linear or rotary, to achieve a desired effect. Linear actuators receive input energy, usually in the form of electricity, pneumatics, and hydraulics, and convert the energy into motion or force along a linear direction, such as a push or pull motion. Linear actuators may be triggered to actuate through a signal input.

The applications for rotary and linear actuators are many and varied, such as in vehicles for controlling (opening and closing) valves, heating and cooling systems, and others. Robotics applications make use of actuators for manipulating appendages and other devices by supplying input signals and energy to achieve motion of the appendages and devices. From hoists to hospital beds, rising desks to retractable television mounts, rotary and linear actuators deliver motion in a variety of applications.

The mechanisms for achieving motion with an actuator are varied as well. For example, in solenoid actuators the input electrical energy creates a magnetic field which ultimately causes the motion of a rod. In pneumatic actuators, a pump compresses pneumatic fluid such as air or other gases to produce the motion of a piston. Similarly, hydraulic actuators produce the motion of a piston using non-compressible hydraulic fluids. Rotary motors may be used to drive linear motion in electric actuators, and actuators with screws, gears, and the like.

Actuators are linked to devices, or effectors, to which they apply the generated force or motion. For example, in a robotics application an actuator may be used to move an appendage. For linear actuators, to maximize efficiency and reliability, side loads need to be minimized. That is, the linear motion achieved is impeded by side loads normal to or otherwise misaligned to the direction of the linear motion. The linkage to an effector is subject to a variety of stresses, particularly side loads presented at the linkage. Such side loads can cause less than optimal transference of motion, lack of axial alignment and centering between the actuator and effector, reducing the linear motion, and stress or even failure at the linkage point, the joint, between the actuator and the effector. For a hoist, for example, which lifts a large a load, such side loads can cause reduced lifting capacity, or in severe cases buckling and failure of the actuator itself. Conventional linear actuators may use additional devices such as slide rails which guide the effector in a linear direction, to help ameliorate the effect of side loads and thereby reduce their impact on the actuators themselves. But such rails are not readily adaptable in many actuator-effector applications, and they are limited in their ability to remove side loads at the joint-effector interface, or side loads internalized to the actuator and joint through misalignment of the joint and the effector.

The art is in need of improved joints for linear actuators with advantages over, and without the disadvantages of, conventional designs.

SUMMARY OF THE INVENTION

Having observed the aforementioned problems with conventional linear actuators, the inventors provide solutions in the form of self-centering compliant joints.

In one solution, the invention provides a novel self-centering compliant joint placed between the actuator and the effector, which joint provides five degrees of freedom (all degrees except axial in the direction of the linear motion) while minimizing the transfer of high side loads into the actuator bearings. One feature of the compliant joint of the invention is that it the compressive load on the compliant joint into a tensile load on an internal rod supported by bearings, by having opposed interlocking spider housings pull on the rod's ends when a compressive load pushes on the exterior of the compliant joint. The joint employs a ball joint mechanism, using spherical bearings which permit an advantageous degree of both rotational and radial misalignment. Additionally, when designed with appropriate small gaps between certain components, the compliant joint permits rotational and radial misalignment, decoupling their degrees of freedom. Further, the compliant joint has inherent fail-safe features in that where the tensile load on the internal rod exceeds the rods ability to carry the load, the spider housings may carry the load themselves. The spherical bearings accommodate side loads and the transferred tensile load to the central rod promotes self-centering. The cylindrical compliant joint of the invention may also be inserted in the tubular body of the actuator itself such that the actuator's overall length remains unchanged.

In one aspect, the invention is directed to a compliant joint for transferring force from an actuator to an effector, the compliant joint having a lower and upper spider housing each with a base, a plurality of fingers extending from the outer region of the base, and the opposite side of each housing having a centered lower spherical concavity. In another aspect, the compliant joint has a central rod with a lower end and an upper end extending through bores through the spider housings, and spherical bearings attached to the rod's ends. In another aspect, the compliant joint has a lower cap with bores therethrough for securing the lower cap with bolts to the upper fingers, and an upper cap bores therethrough for securing the upper cap with bolts to the lower fingers, such that upon assembly the lower fingers and upper fingers interlock, and the spherical bearings are situate in the spherical concavities and capable of movement therein.

In one aspect, the compliant joint, the caps, the spider housings, and the rod are cylindrical. In another aspect, the lower fingers and the upper fingers are threaded to receive the plurality of bolts passing through the upper spider housing and the lower spider housing, respectively. When placed under a compressive load, the compliant joint accommodates a side load by the lower spherical bearing and upper spherical bearing moving within the upper concavity and lower concavity, respectively. In another aspect, the compliant joint transfers the compressive load to a tensile load on the rod, and the rod self-centers. In another aspect, a gap is provided between the lower and upper fingers and their opposed spider housing bases. In yet another aspect, the lower and upper interlocking fingers have generally longitudinal gaps therebetween.

In one aspect, the caps and spider housings are constructed from a material such as metals, alloys, resins, polymers, composites, and carbon fiber, and in a particular aspect they are made from super duplex stainless steel. In another aspect, the rod is constructed from a material such as metals, alloys, resins, polymers, composites, and carbon fiber, and in a particular aspect the rod is made of titanium or monel K-500. In another aspect, the spherical bearings are constructed from a material such as metals, alloys, resins, polymers, composites, and carbon fiber, and in a particular aspect, from Delrin®, ToughMet®, TufLite, or Orkot®. The spherical bearings in one aspect are retained on the rod, each with a nut and a washer, or with a flange on one end. In one aspect the nut and rod are constructed from monel K-500 and the spherical bearings are made of Delrin® 500AF.

These and other aspects of the invention will be readily appreciated by those of skill in the art from the description of the invention herein.

DETAILED DESCRIPTION OF THE INVENTION

Figures 1A, 1B:
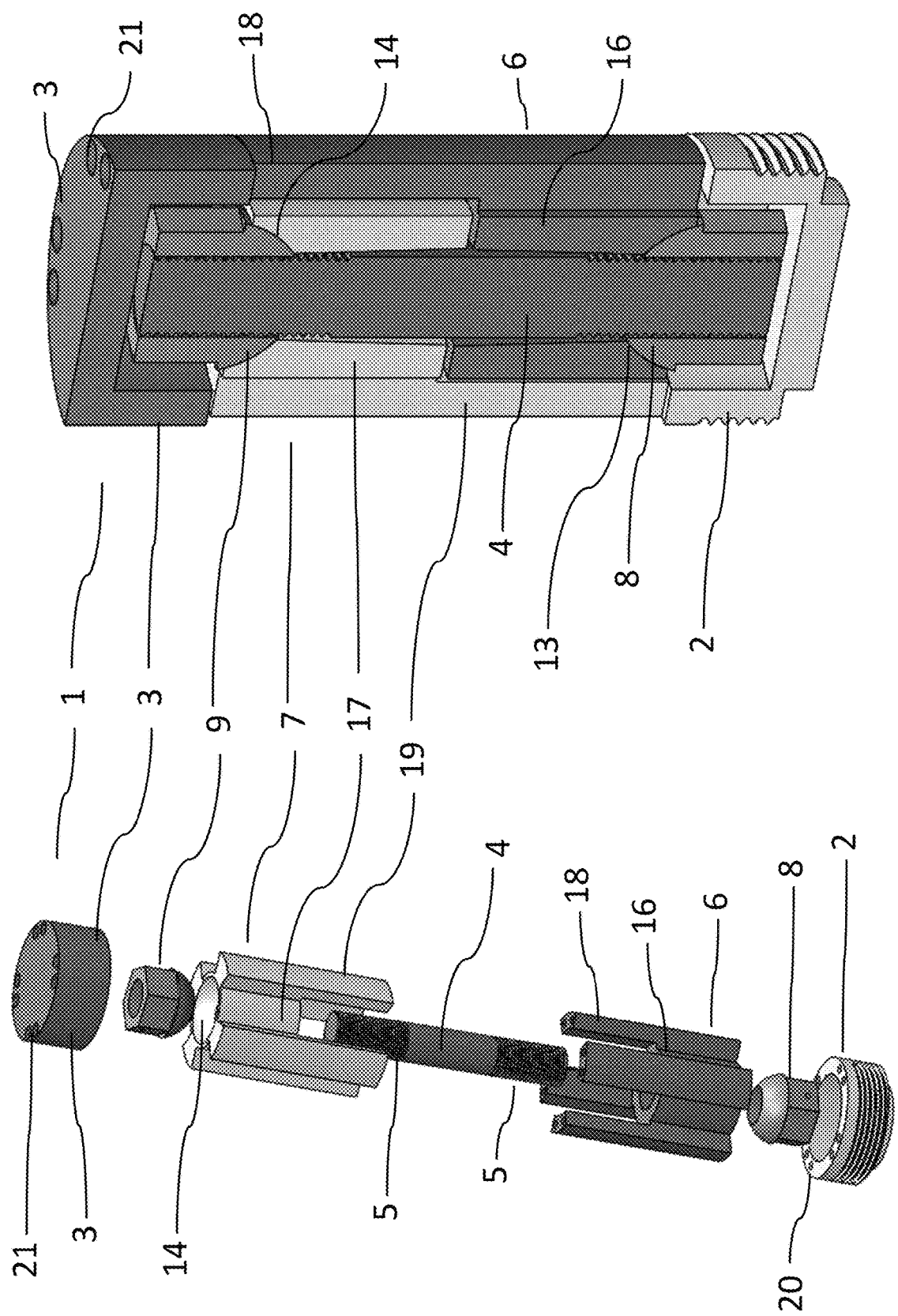
FIG. 1a depicts an embodiment of the compliant joint of the invention, shown in an exploded view.
FIG. 1b depicts an embodiment of the compliant joint of the invention, completely assembled, and in a sectional view.
Figure 2A:
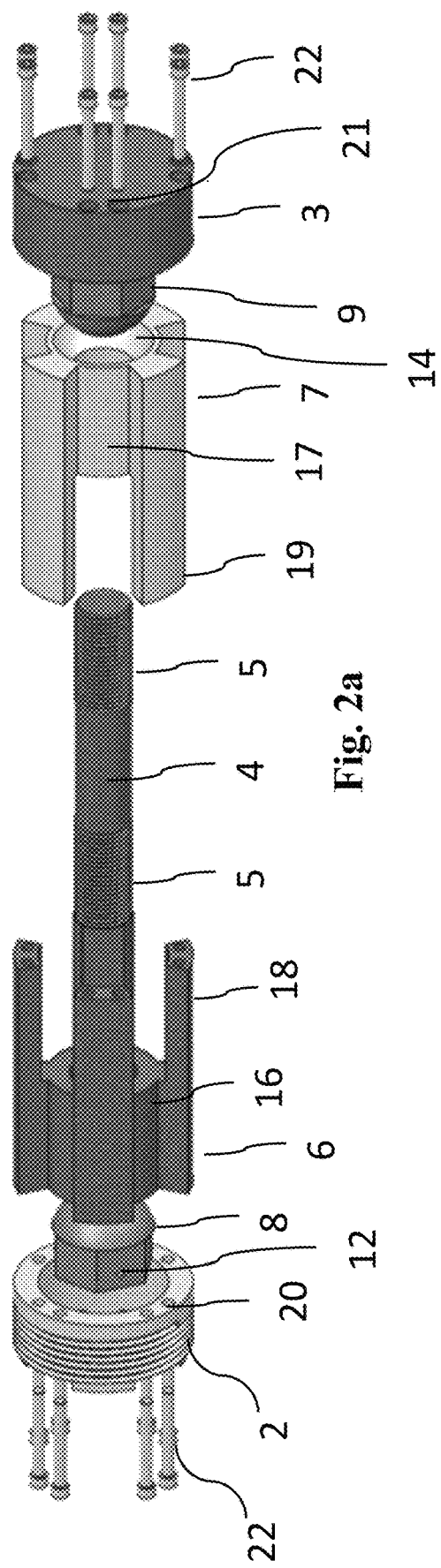
FIG. 2a depicts an embodiment of the compliant joint of the invention, shown in an exploded view.
Figure 2B:
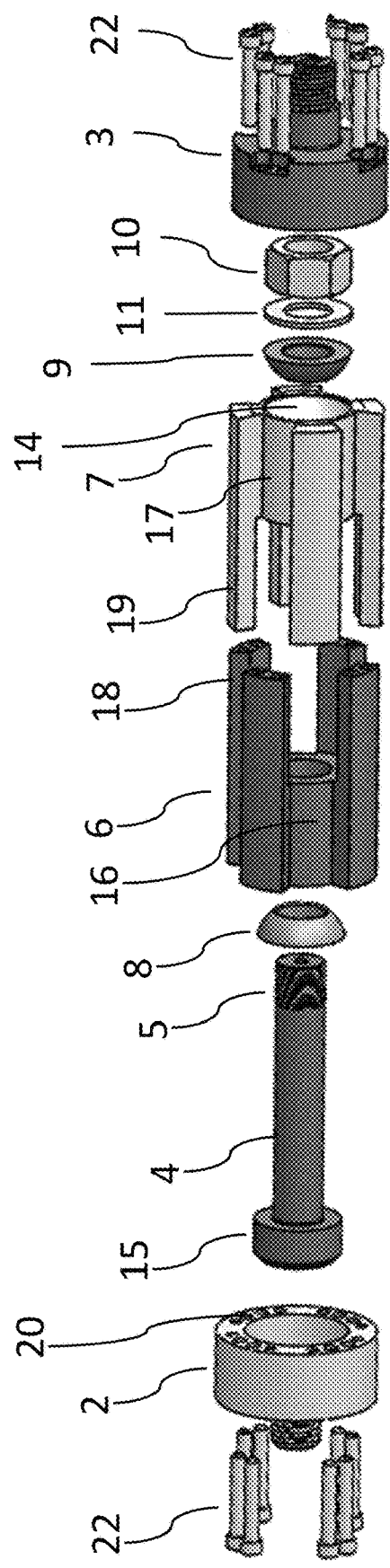
FIG. 2b depicts an embodiment of the compliant joint of the invention, shown in an exploded view.

Conventional joints lack the ability to at least partially disperse compressive loads into tensile loads, reducing the compressive load on the joint. Additionally, conventional joints lack the ability to accommodate side loads and to self-center. The invention accomplishes reduction in compressive load, accommodation of side loads, and self-centering by employing the spherical ball joint features detailed herein. The compliant joint of the invention also decouples rotational and radial degrees of freedom.

While the invention is generally described in an up-down orientation, those of skill in the art will appreciate that the joint may be used in any orientation with equally successful results.

With reference to the Figures, a self-centering compliant joint 1 of the invention features a lower cap 2 and an upper cap 3, which caps are adapted to be operably attached to the actuator and the effector, respectively, whether through matching threads, bolts, or other means known in the art. At the center of the compliant joint 1 is a cylindrical rod 4 which have threads 5 on one or both ends. The lower end of the rod 4 is passed through a central bore in a lower spider housing 6, and the upper end of the rod is passed through a central bore in an upper spider housing 7. A lower spherical bearing 8 and an upper spherical bearing 9 are fitted to the ends of the rod 4.

By spherical it is meant that the bearing's surface is congruent to at least a portion of the surface of a sphere. Additionally, while the spherical bearings 8,9 are described as spherical, other curved sectional non-spherical topologies (e.g., parabolic, hyperbolic) may be used to achieve certain advantageous features of the invention.

In one embodiment, the spherical bearings 8,9 are in the form of one-piece spherical nuts which are threaded on to the ends of the rod. In another embodiment, the spherical bearings 8,9 may be multi-part members, with the bearing surface portion retained to the ends of the rod 4 with conventional nuts, such as hex nuts 10, optionally with washers 11. The convex surfaces of the spherical bearings 8,9 are oriented to face toward the center of the rod 4. The hexagonal sides of single-piece spherical nuts 8,9, or the nuts 10 used to secure multi-part spherical bearings, may be secured to be flush or adjustable at the ends of the rod 4. In some embodiments, the nuts may feature locking mechanisms, such as set-screws 12, thereby allowing for adjustable spacing of the spherical bearings from each other thereby permitting the overall effective length of the rod 4 and bearings 8,9 sub-assembly. Alternatively, the rod may be adapted with spherical bearings on each end by using a rod 4 with a flange 15 at one end to secure the lower spherical bearing 8, such that the compliant joint 1 is built by simply passing the rod 4 through the lower spherical bearing 8, secured by the flange 15 rather than securing the spherical bearing 8 with a nut.

The convex surface in the lower surface of the lower spherical bearing 8 matches a central concavity 13 in the lower surface of the lower spider housing 6, and the convex surface of the upper spherical bearing 9 matches a central concavity 14 in the upper surface of the upper spider housing 7. The lower spider housing 6 has a lower spider housing base 16 and a plurality of lower fingers 18 extending therefrom around its circumference concentric with their bores. The lower fingers extend away from and opposite from the lower spider housing concavity 13. The upper spider housing 7 has an upper spider housing base 17 and a plurality of upper fingers 19 extending therefrom around its circumference concentric with their bores. The upper fingers extend away from and opposite from the upper spider housing concavity 14. The lower fingers 18 extend toward the upper fingers 19 such that the fingers 18,19 of the lower and upper spider housings 6,7 interlock. The number of fingers 18,19 may vary in different embodiments, generally between two and six fingers each. The Figures depict spider housings 6,7 with four fingers 18,19 each.

When the compliant joint is assembled the two spider housings 6,7 may form an essentially complete cylinder in the region where the fingers 18,19 interlock. In some embodiments, space or gaps may be desired between the interlocking fingers 18,19 to permit a degree of travel between the spider housings 6,7 under compressive load, as well as for easy access to the internal regions of the joint. Without any load, the ends of the extended fingers 18,19 do not reach to contact the opposing spider housing bases 16,17. Under high compressive loads, the fingers 18,19 may approach their opposing housing bases 16,17. Should the fingers 18,19 contact the opposing spider housing bases 16,17, no additional compressive force would be transferred to tensile force on the rod 4. Depending on the intended load capacity, the compliant joint may be designed to handle such loads through adjustment of the effective length of the rod 4, the gaps between the fingers 18,19 and opposing housing bases 16,17, and the materials from which the components are constructed. The effective length of the rod may be adjusted by adjusting the locations of the bearings 8,9 and nuts 10 on either end of the rod 4. Set-screws 12 in the bearings 8,9 and nuts 10 may be used to lock their positions on the rod 4 and thereby set the effective length of the rod.

In another embodiment, other set-screws may be placed in the upper surface of the lower spider housing base 16 to prevent contact under heavy compressive loads with the upper spider housing's fingers 19 (and symmetrically preventing contact between the lower spider housing's fingers 18 and the upper spider housing's base 17). Such set-screws may even be adjusted in height without completely disassembling the joint. Instead, the width dimensions of the lower fingers 18 and/or upper fingers 19 may be designed to provide longitudinal gaps between the interlocked fingers 18,19. After removing the upper cap 3, the upper spider housing 7 may be rotated to provide access to such set-screws with an appropriate tool.

The lower cap 2 has bores 20 to receive a plurality of bolts 22 which pass through the lower cap 2 into the lower fingers 18 of the lower spider housing 6, the ends of the lower fingers 18 being threaded to receive the bolts 22. Similarly, the upper cap 3 has bores 21 to receive a plurality of bolts 22 which pass through the upper cap 3 into the upper spider housing 7, the ends of the upper fingers 19 being threaded to receive the bolts 22. With caps 2,3 and bolts 22 secured, the compliant joint 1 is completely assembled and ready for operation.

When a compressive load is applied to the compliant joint 1, such as when the actuator is being used to push an object up from below, the compressive load on the compliant joint is transferred into a tensile load on the central rod 4 by the opposed forces on the spider housings 6,7 bolted to the opposing caps 2,3. The spherical bearings 8,9 allow for an advantageous amount of translational and rotational movement of the rod 4 within the compliant joint to accommodate side loads, and the tensile load on the rod 4 promotes self-centering by driving the bearings 8,9 to return to their centered positions within the housings' concavities 13,14. The mechanical soundness and reliability of the compliant joint is maintained despite significant side loads.

When the compliant joint experiences a tensile load, such as when the actuator is being used to pull an object up from above, the upper and lower spider housing bases 16,17 are forced into contact at the upper surface of the lower spider housing base 16 and the lower surface of the upper spider housing base 17, maintaining the mechanical soundness and viability of the joint.

The rigid components of the compliant joint 1 may be constructed from a variety of materials well known to those of skill in the art, including but not limited to metals (such as titanium, aluminum et al.); alloys (such as bronze, stainless steel, and others); resins; polymers; composites; carbon fiber; and other materials known in the art to have sufficient hardness and strength characteristics suitable for their intended loads. In some embodiments, stainless steels such as austenitic nickel-chromium-based alloys, duplex stainless steels, and super duplex stainless steels are suitable for a wide range of loads. Other nonferrous nickel-copper alloys, such as monel, monel K-500 (a nickel-copper-aluminum alloy), and others provide structural rigidity, resistance to corrosion, and strength characteristics that are suitable for many of the rigid components. Such rigid components include the caps 2,3, the spider housings 6,7, the bolts 22, and the central rod 4. In some embodiments, it may be advantageous to construct certain components in one material and other components in other materials. For example, in one embodiment, the caps 2,3 and the spider housings 6,7 are constructed from stainless steel, such as super duplex stainless steel, and the central rod 4 and bolts 22 are constructed from monel K-500. In other embodiments, the rod 4 is constructed from titanium while the other rigid components are constructed from stainless steel and monel K-500.

The spherical bearings 8,9 may be constructed from a variety of materials known to be particularly suitable for bearings, including the aforementioned metals, alloys, resins, polymers, composites, and carbon fiber. The entire spherical bearings 8,9 may be constructed as a single piece from a single material. In some embodiments, the portion of the spherical bearings 8,9 which are adjustable, such as the hexagonal portion, may be constructed from one material while the bearing surface is formed from another material. In some embodiments, the hexagonal portion may be made of such materials as bronze, other copper-nickel-tin alloys (e.g. ToughMet®), while the bearing surface portion is made of a bearing suitable material such as a composite materials (e.g., TufLite, fiberglass). In other embodiments, the bearings 8,9 are constructed from materials made from technical fabrics impregnated with resins and lubricants (e.g., Orkot®). Such materials provide benefits of allowing the bearings more easily to glide with the concavities 13,14 of the spider housings 6,7. Other materials may also be suitable for the bearings 8,9, such as polymers like Delrin®. In embodiments in which the bearings are multi-piece bearings, the nut 10, and the washer 11 may be constructed from different materials, such as monel k-500, while the bearing 9 itself is constructed from another material, such as bronzes, TufLite, Orkot®, and Delrin®. In other embodiments, some components may be constructed from carbon fiber, graphite, and other suitable materials. Where trade names are used herein, it is intended that their generic equivalents are equally suitable materials.

Those of skill in the art will readily appreciate that an appropriate combination of materials for the components may be selected depending on the application and intended loads for the compliant joint.

EXAMPLES

The following Examples serve to illustrate the present invention and are not intended to limit its scope in any way.

Example 1—A self-centering compliant joint as illustrated in FIG. 4 was constructed as follows. Caps and spider housings of 5.5 inches diameter were constructed from super duplex stainless steel. The rod, measuring 1.75 inches in diameter and with a flange at its lower end, was constructed from Monel K-500, as were the nut, the washer, and the bolts. The spherical bearings were constructed from Delrin® 500AF. The effective length of the rod was set by adjusting the nuts/bearings on the ends thereof to maintain a gap of 0.125 inches between the spider housings bases and the opposing fingers.

The compliant joint measured 5.5 inches in diameter, and 13 inches in length, accommodated up to 0.2 inches of radial misalignment, up to 0.5 degrees of angular misalignment, and at maximum deflection transferred 2.2% of the compressive load.

The compliant joint was subjected to a variety of loads from 15,000 to 90,000 lbf. Axial and radial loads were measured, and demonstrated that the peak radial load accommodated was 5-8% of the axial load, with a radial displacement of 0.2 inches. At a compressive load of 73,000 lbf, the gap between the lower spider housing base and the upper fingers had narrowed but the compliant joint maintained its ability to transfer force from the actuator to the effector.

Example 2—A self-centering compliant joint as in Example 1 was modified as follows:

The caps were also provided with 1.75 inch threaded pieces for attachment at the ends to an actuator and an effector, in this case the intended effector being a platform bearing a weighted object. The top cap's thread piece was mounted on a 2.125 inch shaft interface with a journal bearing for attachment to the desired effector for this application.

Example 3—A self-centering compliant joint as illustrated in FIG. 3 was constructed as follows: Caps and spider housings of 5.5 inches diameter were constructed from super duplex stainless steel. The rod, measuring 1.75 inches in diameter was constructed from titanium. The spherical bearings were constructed from Toughmet® with a convex surface of TufLite or Orkot®. The compliant joint performed successfully at a compressive load of 90,000 lbf, leading to the construction of additional compliant joints with varied specifications.

The present invention is not to be limited in scope by the specific embodiments described above, which are intended as illustrations of aspects of the invention. Functionally equivalent methods and components are within the scope of the invention. Various modifications of the invention, in addition to those shown and described herein, will be readily apparent to those skilled in the art from the foregoing description. Such modifications are intended to fall within the scope of the appended claims. All cited documents are incorporated herein by reference.

What is claimed is:

1. A compliant joint for transferring force from an actuator to an effector, the compliant joint comprising:
    a lower spider housing comprising a lower spider housing base with an upper surface and a lower surface, a plurality of lower fingers extending from the upper surface of the lower spider housing base, and the lower surface of the lower spider housing base having a centered lower spherical concavity;
    an upper spider housing comprising an upper spider housing base with an upper surface and a lower surface, a plurality of upper fingers extending from the lower surface of the upper spider housing base, and the upper surface of the upper spider housing base having a centered upper spherical concavity;
    a central rod with a lower end and an upper end, extending through a bore through the lower spider housing base and the upper spider housing base;
    a lower spherical bearing attached to the lower end of the central rod, and an upper spherical bearing attached to the upper end of the central rod; and
    a lower cap having a plurality of bores therethrough for securing the lower cap to the upper fingers with a plurality of bolts, and an upper cap having a plurality of bores therethrough for securing the upper cap to the lower fingers with a plurality of bolts;
    wherein upon assembly the lower fingers and upper fingers interlock, the lower spherical bearing is situate in the lower spherical concavity, and the upper spherical bearing is situate in the upper spherical concavity.

2. The compliant joint of claim 1, wherein the compliant joint, the caps, the spider housings, and the rod are cylindrical.

3. The compliant joint of claim 1, wherein the lower fingers and the upper fingers are threaded to receive the plurality of bolts passing through the upper spider housing and the lower spider housing, respectively.

4. The compliant joint of claim 1, wherein, when placed under a compressive load, the compliant joint accommodates a side load by the lower spherical bearing and upper spherical bearing moving within the upper concavity and lower concavity, respectively.

5. The compliant joint of claim 4, wherein the compliant joint transfers the compressive load to a tensile load on the rod, whereby the rod self-centers.

6. The compliant joint of claim 1, wherein a gap is provided between the lower and upper fingers and their opposed spider housing bases.

7. The compliant joint of claim 6, wherein the lower and upper interlocking fingers have longitudinal gaps therebetween.

8. The compliant joint of claim 1, wherein the caps and spider housings are constructed from a material selected from the group consisting of metals, alloys, resins, polymers, composites, and carbon fiber.

9. The compliant joint of claim 1, wherein the caps and spider housings are constructed from super duplex stainless steel.

10. The compliant joint of claim 9, wherein the rod is constructed from a material selected from the group consisting of stainless steel, titanium, and monel K-500.

11. The compliant joint of claim 1, wherein the spherical bearings are constructed from a material selected from the group consisting of metals, alloys, resins, polymers, composites, and carbon fiber.

12. The compliant joint of claim 11, wherein the spherical bearings are constructed from a polymer material.

13. The compliant joint of claim 1, wherein the spherical bearings are retained on the rod, each with a nut and a washer.

14. The compliant joint of claim 13, wherein the rod has a flange at one end to retain one of the spherical bearings.

15. The compliant joint of claim 1, wherein the nut is constructed from monel K-500.

16. The compliant joint of claim 15, wherein the rod is constructed from monel K-500, and the spherical bearings are constructed from a polymer material.

* * * * *